E. S. STALKER.
TIRE PROTECTOR.
APPLICATION FILED DEC. 13, 1915.
1,224,803.
Patented May 1, 1917.
2 SHEETS—SHEET 2.
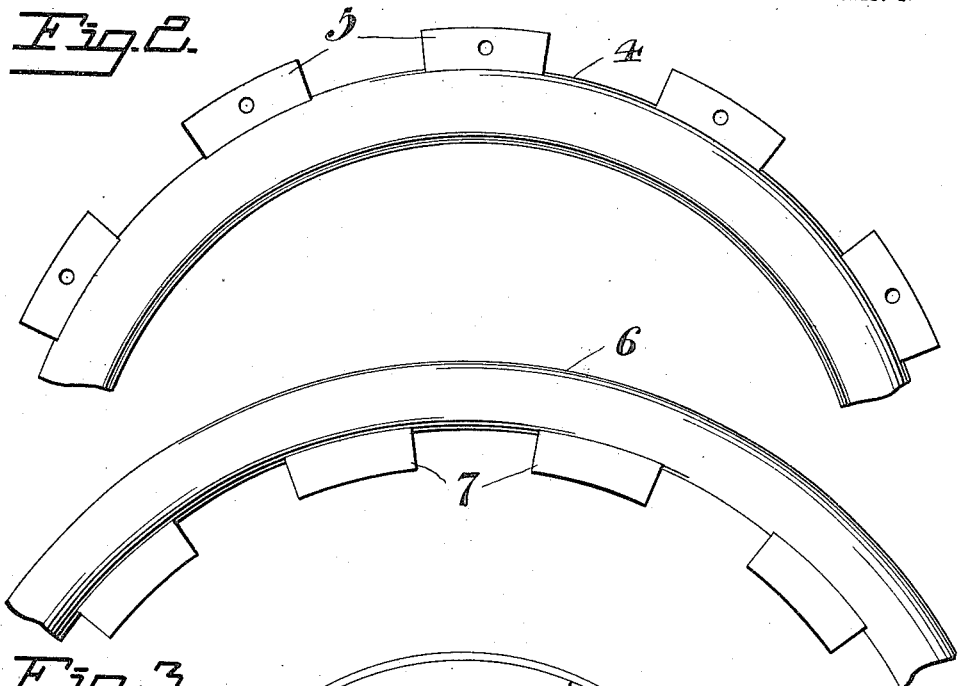
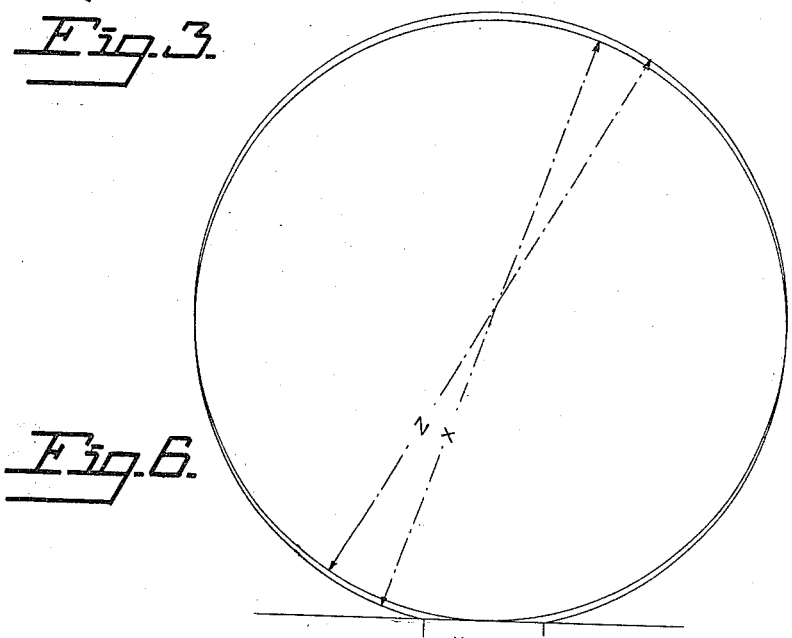
Witnesses
John D. Spalding
R. M. Smith
Inventor
E. S. Stalker
By Victor J. Evans
Attorney

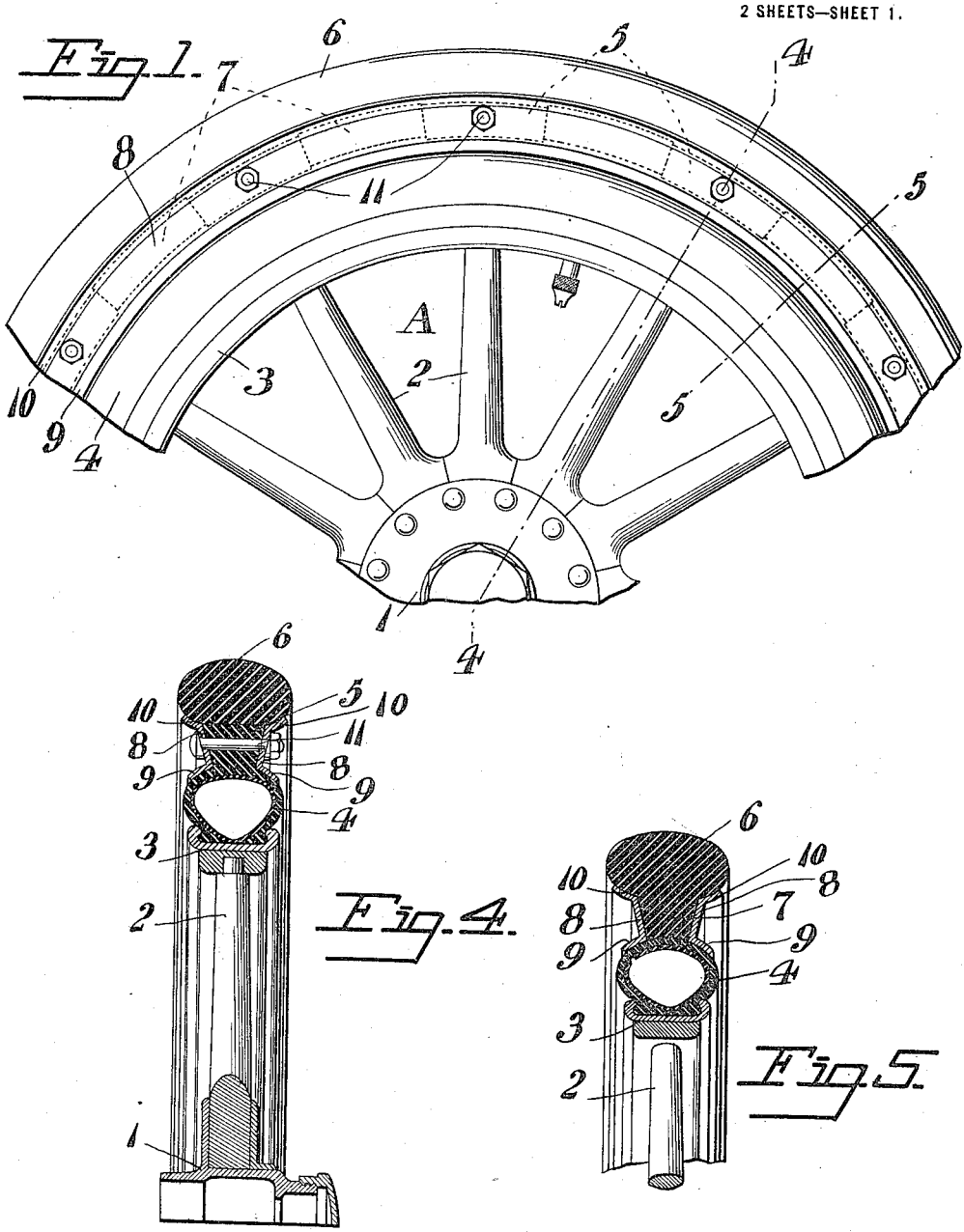

UNITED STATES PATENT OFFICE.

ELI S. STALKER, OF HALLSTEAD, PENNSYLVANIA.

TIRE-PROTECTOR.

1,224,803. Specification of Letters Patent. Patented May 1, 1917.

Application filed December 13, 1915. Serial No. 66,573.

*To all whom it may concern:*

Be it known that I, ELI S. STALKER, a citizen of the United States, residing at Hallstead, in the county of Susquehanna and State of Pennsylvania, have invented new and useful Improvements in Tire-Protectors, of which the following is a specification.

This invention relates to tire protectors and especially protectors for pneumatic tires, the object in view being to provide a device of the character specified which may be used in conjunction with an ordinary pneumatic tire and which will prevent any possibility of punctures and blow outs and also give increased power to the engine driving a motor vehicle in that the protector overcomes the flattening of that portion of the tire which comes in contact with the road surface.

A further object in view is to produce a tire protector of the character referred to which may be easily and reliably secured in place and which cannot shift or creep in relation to the pneumatic tire, the parts being so arranged that the greater the load imposed on the tire and its protector, the stronger will be the gripping action between said parts.

A further object in view is to so combine the tire and protector as to prevent gravel and the like from accumulating in the joints or meeting faces between the tire and its protector.

With the above and other objects in view, the invention consists in the novel construction, combination and arrangement of parts, as herein described, illustrated and claimed.

In the accompanying drawings:—

Figure 1 is a side elevation of a sufficient portion of a vehicle wheel to illustrate the application of the present invention thereto.

Fig. 2 is a fragmentary side elevation of the pneumatic tire.

Fig. 3 is a similar view of the protector.

Fig. 4 is a cross section on the line 4—4 of Fig. 1 on an enlarged scale.

Fig. 5 is another cross section on the line 5—5 of Fig. 1.

Fig. 6 is a diagrammatic side elevation illustrating the action of a pneumatic tire when equipped with the protector of this invention.

Referring to the drawings, A designates generally a vehicle wheel comprising a hub 1, spokes 2 and a fixed rim 3, all of said parts being rigidly related to each other and of the ordinary construction.

In carrying out the present invention, the pneumatic tire indicated at 4 is provided on its outer or tread face with bosses 5 which are wedge-shaped in cross section as shown in Fig. 4 and which are curved to conform to the outer circumference of the tire 4.

Encircling the tire 4 is a tire protector or auxiliary tire 6 which is provided on its inner face with bosses 7 which are also wedge-shaped in cross section as shown in Fig. 5, the bosses 7 like the bosses 5 also being curved to conform to the inner face of the protector 6 and the length of the bosses 5 and 7 being such that they will fit snugly between each other as indicated in Fig. 1, said bosses as well as the tire 4 and the protector 6 being composed of resilient material such as rubber.

The means for securely retaining the protector and tire in proper working relation to each other embodies a pair of annular retaining or clamping rings 8 each having along its inner margin a curved flange 9 and having along its outer edge another curved flange 10. The flanges 9 and 10 are continuous or endless like the rings 8, the flanges 9 bearing against the outer body portion of the pneumatic tire 4 and the flanges 10 bearing against the inner side of the body of the protector 6. Bolts 11 are inserted at intervals through the rings 8 and also through the interfitting bosses 5 of the tire 4.

In view of the fact that the protector or auxiliary tire or tread 6 is composed of solid resilient material such as rubber, it is practically impossible to puncture the pneumatic tire 4 or injure the same so as to weaken the walls of the tire and produce a blow out.

Referring to Fig. 6, the line X indicates the action of a pneumatic tire when load is imposed thereon, the bottom portion of said tire being flattened between the lines Y and therefore requiring additional power to drive the wheel. The line Z represents the action of a pneumatic tire equipped with the protector of this invention, there being practically no flattening of the tire where it touches the road surface. This is caused by reason of the fact that the retaining rings tightly confine the pneumatic tire and the protector thereby equalizing or distributing the pressure around the whole tire instead of allowing the tire to be compressed for only a relatively small space along the tread surface thereof. This, however, does not interfere with the requisite resiliency of the pneumatic tire but retains practically the full resiliency of the tire in addition to the prevention of punctures and blow outs.

The exposed surfaces of the tires 4 and 6 may be either rough, smooth or corrugated, as may be desired.

Having thus described my invention, I claim:—

A pneumatic tire provided on its outer face with integral projecting solid resilient bosses, a tire protector of solid resilient material encircling said tire and provided with projecting integral solid resilient bosses on its inner face corresponding in shape with and lying between and in abutting contact with the bosses of the tire and laterally insertible and removable in relation to said tire bosses, retaining rings located at opposite sides of both sets of bosses between the body of the tire and the body of the protector, and fastening means inserted through the tire bosses and said retaining rings.

In testimony whereof I affix my signature in presence of two witnesses.

ELI S. STALKER.

Witnesses:
WM. E. BARNES,
G. A. STALKER.

Copies of this patent may be obtained for five cents each, by addressing the "Commissioner of Patents, Washington, D. C."